United States Patent
Lin et al.

(10) Patent No.: US 10,788,867 B2
(45) Date of Patent: Sep. 29, 2020

(54) EXTENDABLE HANDLE FOR COMPUTER COMPONENT

(71) Applicant: Dell Products L.P., Round Rock, TX (US)

(72) Inventors: Kuang Hsi Lin, Taoyuan (TW); Ling Chen Chang, Taipei (TW); Chih Min Su, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 15/093,644

(22) Filed: Apr. 7, 2016

(65) Prior Publication Data

US 2017/0293327 A1    Oct. 12, 2017

(51) Int. Cl.
*G06F 1/18* (2006.01)
*G06F 1/16* (2006.01)

(52) U.S. Cl.
CPC ............ *G06F 1/182* (2013.01); *G06F 1/1679* (2013.01); *G06F 1/184* (2013.01)

(58) Field of Classification Search
CPC ........... Y10T 16/473; Y10T 403/32483; Y10T 403/32451; B25G 3/16; B25G 1/043
See application file for complete search history.

(56) References Cited

U.S. PATENT DOCUMENTS

| | | | | |
|---|---|---|---|---|
| 1,575,593 A | * | 3/1926 | Seiter | B25B 13/00 81/179 |
| 2,246,831 A | * | 6/1941 | Bechik | A47C 21/046 16/429 |
| 3,421,349 A | * | 1/1969 | Clair, Jr. | A45C 11/328 70/414 |
| 4,070,932 A | * | 1/1978 | Jeannotte | B25G 1/043 16/429 |
| 4,082,302 A | * | 4/1978 | Albrecht | A63C 11/224 135/66 |
| 5,911,798 A | * | 6/1999 | Arnold | B25G 1/043 81/177.1 |
| 6,073,307 A | * | 6/2000 | Santos | A63C 11/224 16/429 |

(Continued)

FOREIGN PATENT DOCUMENTS

JP    3185133 U  *  8/2013  ......... E05B 65/0014

*Primary Examiner* — Victor D Batson
*Assistant Examiner* — Matthew J Sullivan
(74) *Attorney, Agent, or Firm* — Norton Rose Fulbright US LLP

(57) ABSTRACT

A handle for a computer component, such as a motherboard, of an information handling system may have an adjustable size. By allowing the handle to change size, the advantages of a large handle, such as easy handling and reduced damage to nearby components, are gained, and the advantages of a small handle, such as reduced size and improved airflow, are gained. The handle may be affixed to a computer component by any fastener such as a screw, pin, clip, or plastic connector. The handle may change size by increasing in height from a collapsed position to an expanded position, or change size by decreasing in height from an expanded position to a collapsed position. The handle may be moved into the expanded position for handling during assembly or repairs of a computer system, and then moved in to the collapsed position for normal operation of the computer system.

17 Claims, 8 Drawing Sheets

(56) References Cited

U.S. PATENT DOCUMENTS

| | | | |
|---|---|---|---|
| 6,182,539 B1* | 2/2001 | Webster | B25B 23/0021 |
| | | | 81/177.2 |
| 6,952,341 B2* | 10/2005 | Hidaka | G11B 33/022 |
| | | | 312/332.1 |
| 7,484,982 B1* | 2/2009 | Royle | H01R 13/2421 |
| | | | 439/311 |
| 8,136,430 B2* | 3/2012 | Hu | B25G 1/043 |
| | | | 81/177.2 |
| 8,819,898 B2* | 9/2014 | Xie | E05B 65/0014 |
| | | | 16/414 |
| 2007/0062343 A1* | 3/2007 | Dodson, Jr. | B25B 23/0021 |
| | | | 81/177.2 |

* cited by examiner

EXTENDABLE HANDLE FOR COMPUTER COMPONENT

FIELD OF THE DISCLOSURE

The instant disclosure relates to computer systems. More specifically, portions of this disclosure relate to handles for handling computer components, such as during installation or repair of computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These information handling systems include motherboards that interconnect components within an information handling system. "Motherboards" are named from their functionality as being the "mother" board where other boards are plugged in during assembly. The motherboard often includes components such as a socket for a processor, memory slots for random access memory (RAM), and peripheral board slots for graphics cards, networking cards, and the like. Motherboards are also one of the largest components within a computer system in terms of lateral size because the motherboard interconnects many of the components together. One of the first components placed in a chassis when a computer system is being built is the motherboard, and there may be little clearance on any side of the motherboard in the chassis for handling the motherboard during assembly. That is, the chassis is often sized to fit snugly around the motherboard. To minimize possible damage to the motherboard during assembly and other handling, handles may be attached on a topside of the motherboard. Examples of such handles are shown in FIG. 1 and FIG. 2. The handles may be held, rather than the motherboard itself, and used to insert and remove the motherboard in the chassis and position the motherboard within the chassis and throughout assembly. Because workers are not handling the actual motherboard, damage to the motherboard, such as broken connectors or components, is reduced.

FIG. 1 is one example of a motherboard handle according to the prior art. A motherboard 102 includes connectors 102A, such as for connecting storage devices, and slots 102B, such as for receiving memory modules. The motherboard 102 also includes a handle 110 affixed to the motherboard 102 by a screw (not shown). An elevation view of the handle 110 is shown in blow-out graphic 112 of FIG. 1. The handle 110 has a width W and a length L selected to be large enough to allow easy handling of the motherboard 102. Although the handle 110 may provide benefits during assembly or repair of a computer system, the handle 110 presents challenges to design of the computer system. One challenge is that the handle 110 occupies a large amount of space within the chassis. Computer systems are continuing to decrease in size, particularly when used in information handling systems installed in data centers, and the size of handle 110 makes further size reductions difficult. Another challenge is that the handle 110 blocks air flow through the chassis. Computer systems are increasing in computational power and, while also increasing in power efficiency, the cooling needs of computer components, particularly in small chassis are more demanding. Blocking airflow of cool air into the chassis or hot air out of the chassis can mean the handle 110 can significantly change temperatures within the chassis and adversely impact performance of components in the chassis.

One solution to these problems is to reduce the size of the motherboard handle, as shown in the example of FIG. 2. FIG. 2 is another example of a motherboard handle according to the prior art. The motherboard 102 of FIG. 2 includes a handle 210 affixed to the motherboard 102 by latches 210A. The handle 210 is shown in elevation view with a width W2 and a height L2 that may be smaller than the width W and length L of handle 110. However, the handle 210 becomes more difficult to handle. For example, when a worker is reaching for the handle 210 and moving his hand around to locate the handle 210 the worker may inadvertently scratch or break off nearby component 220.

SUMMARY

Certain embodiments of this disclosure include a handle with an adjustable size for a computer component. The adjustable handle may be a member adapted for gripping by a user that may support all or at least a portion of the weight of the device and may be used for manipulating the computer component and positioning the computer component for installation, servicing, repairing, and uninstalling with respect to a chassis or other container or storage unit. By adapting the handle to change size, advantages of a large handle, such as easy handling and reduced damage to nearby components, may be gained, and advantages of a small handle, such as reduced size and improved airflow, may be gained. The handle may be affixed to a computer component by any suitable fastener, such as a screw, pin, clip, snap hook, or plastic connector. The handle may change size by increasing in height from a collapsed position to an expanded position, or change size by decreasing in height from an expanded position to a collapsed position. The handle may be moved into the expanded position for handling during assembly or repairs of a computer system, and then moved in to the collapsed position for normal operation of the computer system. Thus, much of the space occupied by the handle is only occupied when there is a need for the handle's function. When the need for the handle's function is complete, the handle may be adjusted to a collapsed position such that its size is reduced according to some embodiments to reduce unnecessarily occupied space in a chassis. An adjustable handle according to some embodiments of the disclosure may provide an adjustable handle providing 50% more height without occupying more space than an equivalent prior art handle. In one embodiment, the adjustable handle may expand from a 10 mm height when in the collapsed position to a 15 mm height when in the expanded position.

The handle of some embodiments may be attached to any computer component for handling of that computer component. In many of the examples described below, a handle is shown and described attached to a motherboard, and the handle provides easy handling of the motherboard to install the motherboard into or remove the motherboard from a chassis. However, the handle of some embodiments may be affixed to any appropriate host computer component to allow easy handling of that computer component. For example, the handle described may be attached to circuitry, such as motherboards, daughterboards, circuit boards, memory boards, peripheral component boards, and the like. The computer components used with the adjustable handle may also include drives, such as solid state drives (SSDs), compact disc read-only memory (CD-ROM) drives, digital versatile disc read-only memory (DVD-ROM) drives, and Blu-ray drives. Further, the computer components may include power supplies, circuit boards, memory modules, cache modules, graphics cards, expansion boards, wireless modules, switching modules, routing modules, etc. Some embodiments of the adjustable handle may be particularly well suited for components with exposed circuitry, such as circuit boards, for which handling the components may damage the exposed circuitry. Some embodiments of the adjustable handle may be particularly well suited for components that fit into tight areas, such as motherboards, for which handling edges of the components are challenging for workers.

According to one embodiment, an apparatus may include a handle for a computer component. The handle may be configured to extend to an expanded position for use during handling of the computer component. The handle may also be configured to contract to a collapsed position for operation of the computer component.

In certain embodiments, the handle may include an outer portion and an inner portion. The inner portion may include a latch configured to fix the handle in one of the expanded position and the collapsed position. The outer portion may include a receiver for the latch, such as a groove, configured to receive the latch of the inner portion, and that groove may include a segment for storing the latch when the handle is in one of the expanded position and the collapsed position. In some embodiments, the latch and the receiver may alternatively be located on the outer portion and the inner portion, respectively. The handle may be affixed to the computer component through an opening extending through at least a portion of the handle, wherein the opening is configured to receive a fastener to affix the handle to the computer component. The opening may extend through the inner portion of the handle.

Additionally, or alternatively, an apparatus may include a handle for a computer component. The handle may include a first piece comprising an opening extending through the first piece, wherein the opening is configured to receive a fastener to affix the first piece to the computer component. The handle may include a second piece fitting around the first piece, wherein the second piece is configured to operate in conjunction with the first piece to modify a height of the handle by moving from a collapsed position to an expanded position.

In certain embodiments, the first piece may include a latch, and the second piece may include a groove configured to receive the latch of the first piece such that the groove allows fixation of the handle in at least one of the collapsed position and the expanded position. For example, the second piece may be configured to rotate around the first piece to move from the collapsed position to the expanded position by appropriately engaging or disengaging the latch. In one embodiment, the second piece may be configured to rotate a first amount to unlock the first piece from the collapsed position, to be pulled into the expanded position, and to rotate a second amount to lock the first piece in the expanded position.

In various embodiments, a bias mechanism, such as a spring, may be included to bias the handle into one or other of the collapsed position or the expanded position. For example, a spring may hold the handle in the collapsed position until a sufficient force is provided, such as by a worker, to oppose the spring force and cause the handle to move into the expanded position. The worker may then engage a latch, such as by rotating the handle, and hold the handle in the expanded position. When the worker disengages the latch, such as by again rotating the handle, the spring causes the handle to move into the collapsed position.

One method for actuating a handle of a computer component may include receiving a lateral force at a handle for a computer component; receiving a subsequent force, such as a rotational force, at the handle for the computer component; and/or moving the handle from a collapsed position to an expanded position using the received lateral force and the received subsequent force. In one embodiment, the lateral force may be received at an outer portion to move the handle from the collapsed position to the expanded position and the rotational force may be received at the outer portion to rotate the outer portion around an inner portion to lock the outer portion in the expanded position. In another embodiment, the lateral force may be received at an outer portion to move the handle from the collapsed position to the expanded position, the rotational force may be received at the outer portion to unlock the outer portion from an inner portion to release the handle from the collapsed position, and an additional rotational force may be received to lock the outer portion in the expanded position. Although a lateral force is described, the lateral force may include longitudinal forces depending on the orientation of the computer component. That is, where a "lateral force" is described herein, that "lateral force" should be considered to include longitudinal forces.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

An adjustable handle for a computer component, such as a motherboard, may extend from a collapsed position to an expanded position. In the expanded position, the adjustable handle of some embodiments provides easy handling of the computer component. In the collapsed position, embodiments of the adjustable handle reduce space consumed in a chassis and/or improves airflow through the chassis.

Figure 1:
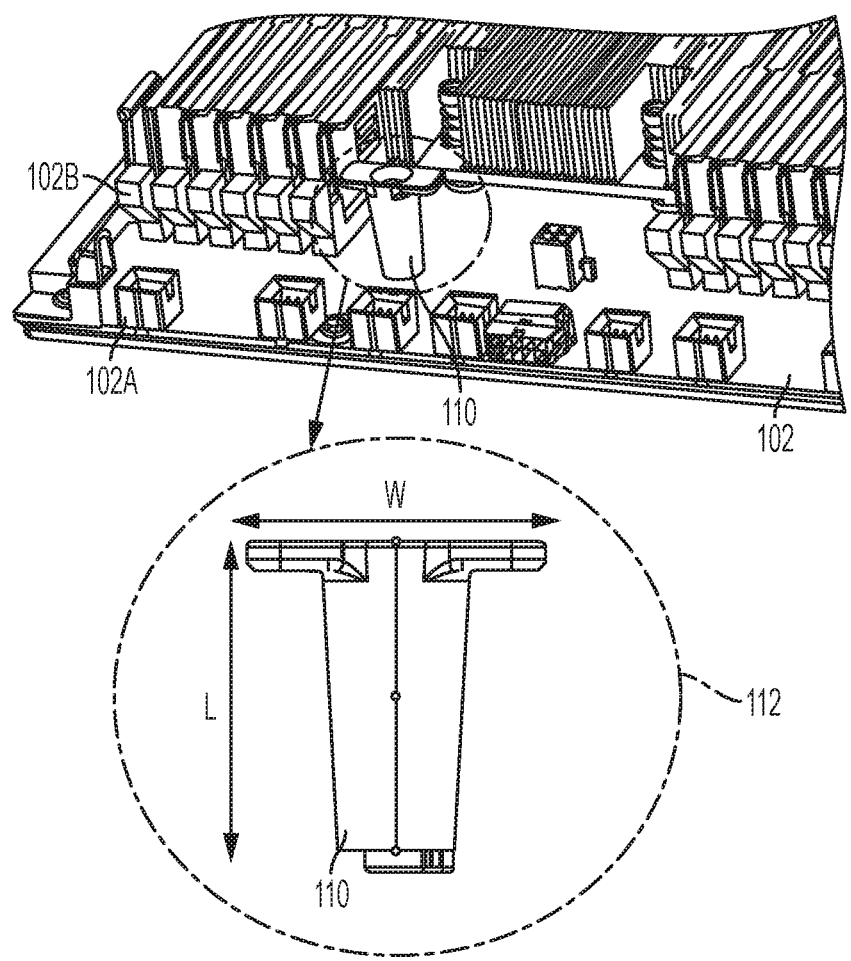
FIG. 1 is one example of a motherboard handle according to the prior art.
Figure 2:
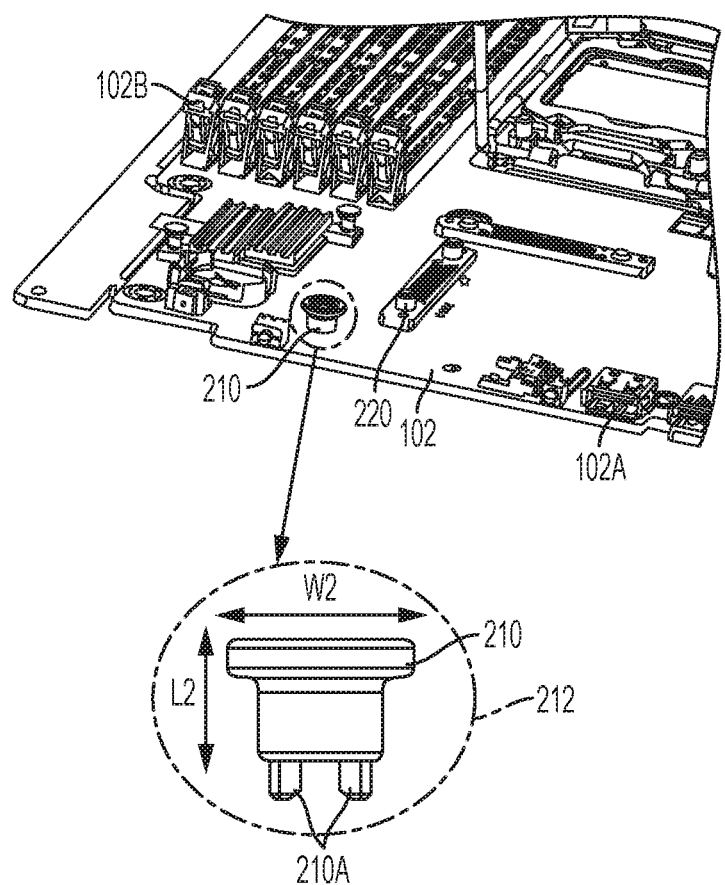
FIG. 2 is another example of a motherboard handle according to the prior art.
Figure 3A:
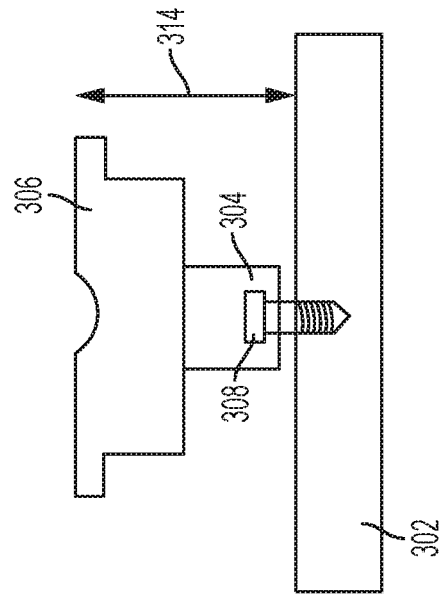
FIG. 3A is an illustration showing an adjustable handle for a computer component in a collapsed position according to one embodiment of the disclosure.
Figure 3B:
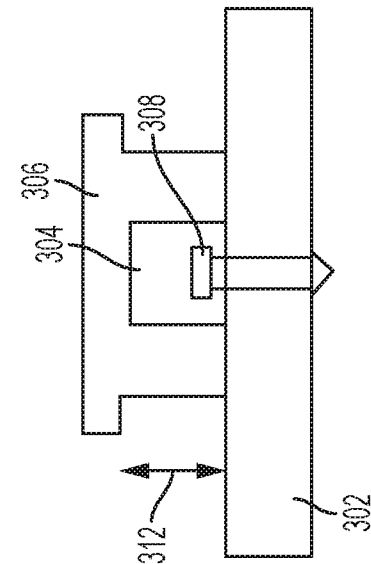
FIG. 3B is an illustration showing an adjustable handle for a computer component in an expanded position according to one embodiment of the disclosure.

One example of an adjustable handle is shown in FIGS. 3A-3B. FIG. 3A is an illustration showing an adjustable handle for a computer component in a collapsed position according to one embodiment of the disclosure. An adjustable handle may include an inner portion 304 and an outer portion 306. The adjustable handle may be attached to a computer component through an opening in the inner portion 304 by fastener 308. Although a screw is shown in FIG. 3A, the fastener 308 may include other components such as a pin, plastic clip, snap hook, or other attachment device. In a collapsed state, the outer portion 306 may be approximately level with the inner portion 304, such that the outer portion 306 does not extend above the inner portion 304 and the height of the handle is thus no larger than the inner portion 304 alone. A total height 312 of the adjustable handle may be smaller than other handles with similarly easy handling, such as the conventional handle of FIG. 1. The total height 312 of the adjustable handle may be approximately equal to or even smaller than other handles that are more difficult to handle, such as the conventional handle of FIG. 2.

The adjustable handle of FIG. 3A may be moved from the collapsed position shown in FIG. 3A to an expanded position when handling the computer component 302. FIG. 3B is an illustration showing an adjustable handle for a computer component in an expanded position according to one embodiment of the disclosure. The outer portion 306 may be raised above the inner portion 304 to extend a height of the adjustable handle from height 312 of FIG. 3A to height 314 of FIG. 3B. The outer portion 306 may be raised above the inner portion 304 and/or locked in place over the inner portion 304 by a number of operating mechanisms, some of which are described with respect to embodiments illustrated below. In some embodiments, the inner portion 304 may be a frustum of a cone such that the lumen of outer portion 305 wedges against the surface of inner portion 304 when the handle is in an expanded position.

One example technique for operating the outer portion 306 in conjunction with inner portion 304 includes using screw threads on an outside of the inner portion 304 to allow the outer portion 306 to be raised up and lowered down by turning the outer portion 306 around the inner portion 304. Another example technique for operating the adjustable handle is by pulling the outer portion 306 upwards and twisting the outer portion 306 to lock the outer portion 306 in the expanded position, such as described with reference to FIG. 4A, FIG. 4B, and FIG. 5. A further example technique for operating the adjustable handle is by rotating the outer portion 306 to unlock from the collapsed position, pulling up on the outer portion 306, and then rotating the outer portion 306 to lock into the expanded position, such as described with reference to FIG. 6A, FIG. 6B, FIG. 6C, FIG. 6D, and FIG. 7.

Figure 3C:
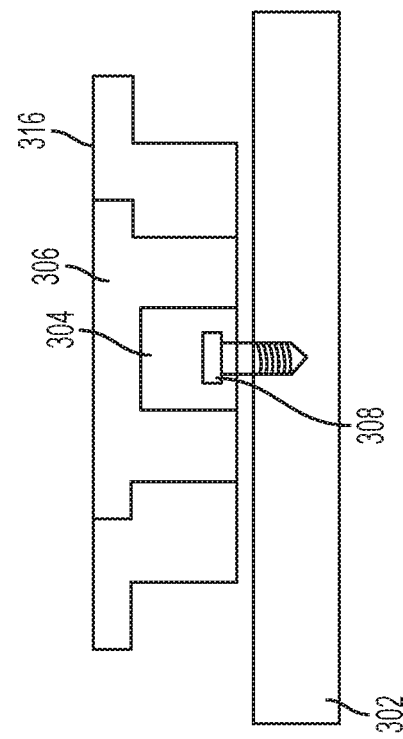
FIG. 3C is an illustration showing an adjustable telescoping handle for a computer component in a collapsed position according to one embodiment of the disclosure.

The adjustable handle shown in FIG. 3A and FIG. 3B provides a height 314 in the expanded position of as much as 50% more than the height 312 in the collapsed position. Only a single outer portion 306 is shown in FIG. 3A and FIG. 3B. However, additional outer portions may be added around outer portion 306 to provide further increases in available height in a telescoping manner. For example, FIG. 3C is an illustration showing a telescoping adjustable handle for a computer component in a collapsed position according to one embodiment of the disclosure. The adjustable handle of FIG. 3C is similar to that of FIG. 3B but includes an additional outer portion 316 around the outer portion 306. The operation of outer portion 316 around outer portion 306 may be similar or dissimilar from the operation of outer portion 306 around inner portion 304.

Figure 3D:
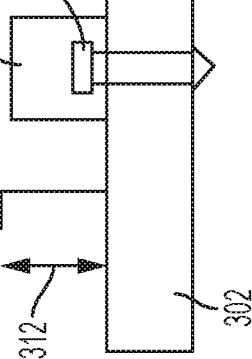
FIG. 3D is an illustration showing an adjustable handle for a computer component affixed to the component with a snap hook according to one embodiment of the disclosure.

Although a screw is shown in the embodiments of FIGS. 3A, 3B, and 3C, other fasteners may be used to affix the adjustable handle to the computer component. FIG. 3D is an illustration showing an adjustable handle for a computer component affixed to the component with a snap hook according to one embodiment of the disclosure. In FIG. 3D, the fastener 308 is shown as a snap hook that includes a locking piece that extends through the computer component 302. The locking piece of the snap hook may be compressed to fit through an opening in the computer component 302, and when the compression is remove the locking piece may expand to prevent removal back through the computer component 302, and thus affix the adjustable handle to the computer component 302.

Figure 4A:
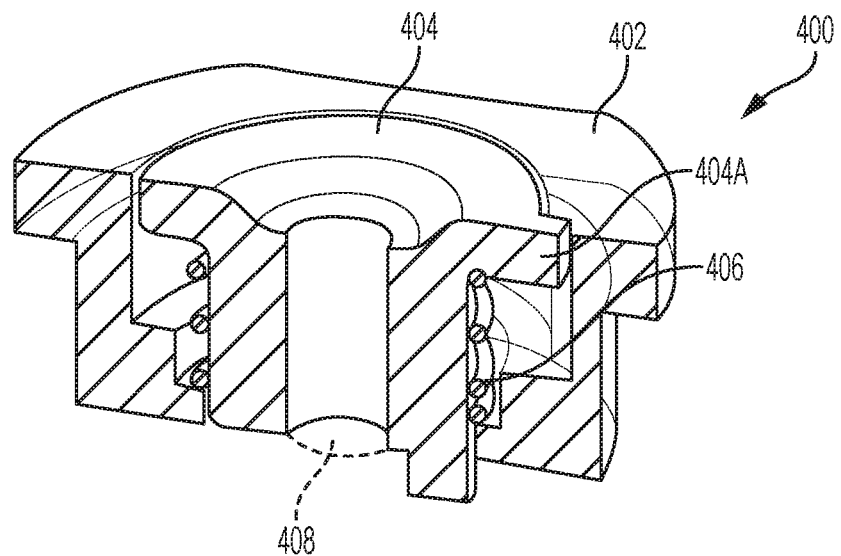
FIGS. 4A-4B are illustrations showing operation of an example adjustable handle for a computer component operated to move to an expanded position and again to a collapsed position according to one embodiment of the disclosure.
Figure 4B:
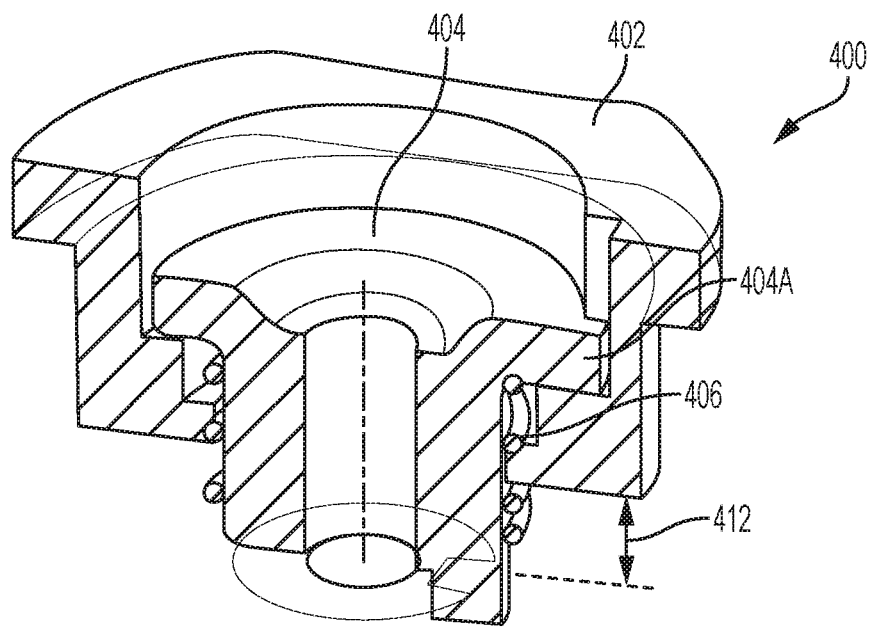

FIGS. 4A-4B are illustrations showing operation of an example adjustable handle for a computer component operated to move to an expanded position and again to a collapsed position according to one embodiment of the disclosure. Referring first to FIG. 4A, an adjustable handle 400 may include an inner portion 404 and an outer portion 402. The inner portion 404 may include an opening 408 for a fastener (not shown) to attach the adjustable handle 400 to a computer component (not shown). A bias mechanism 406, such as a spring, may be attached to the inner portion 404 and/or the outer portion 402 to maintain the adjustable handle 400 in either an expanded position or a collapsed position. The inner portion 404 may include a feature 404A, such as a protrusion, that may be used as a latch to hold the adjustable handle 400 in either the expanded position or the collapsed position against a force applied by the bias mechanism 406.

Figure 5:
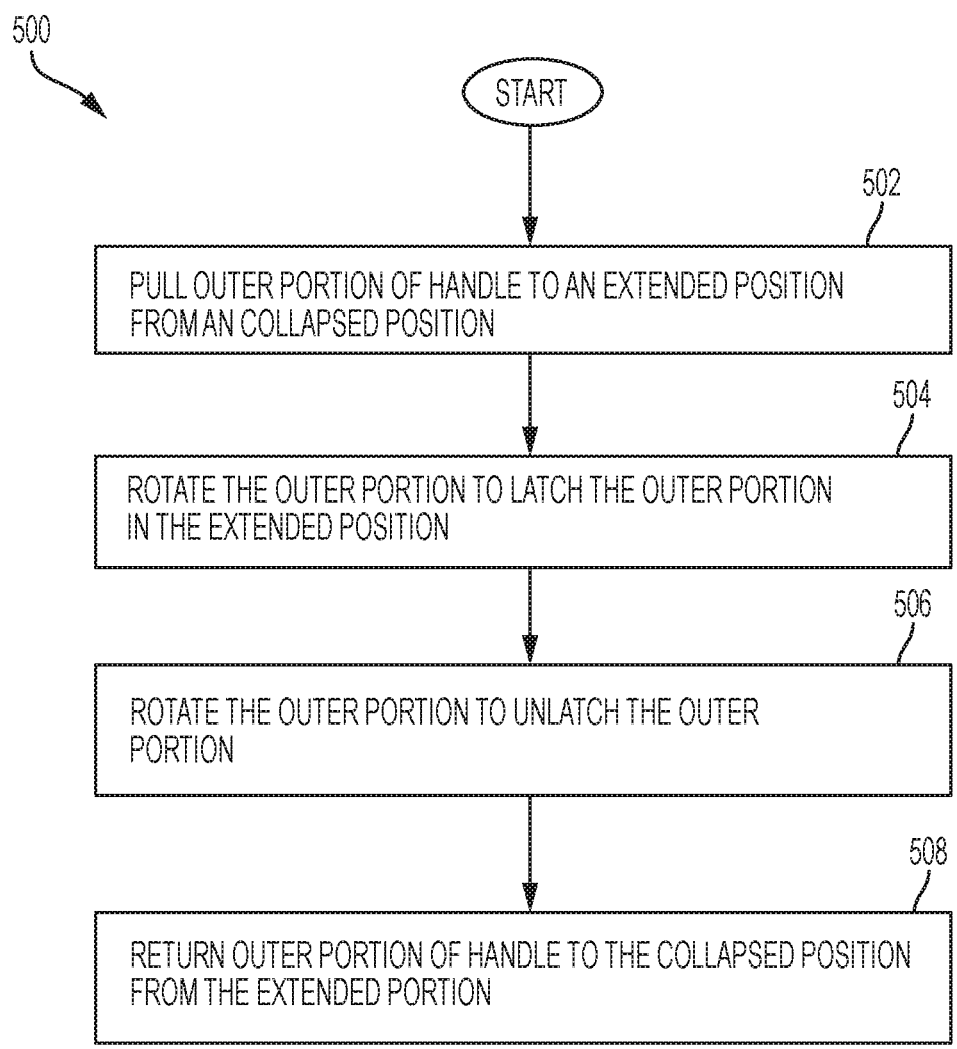
FIG. 5 is an example flow chart showing operation of an example adjustable handle for a computer component according to one embodiment of the disclosure.

Operation of embodiments of the adjustable handle 400 is described in FIG. 5. FIG. 5 is an example flow chart showing operation of an example adjustable handle for a computer component according to one embodiment of the disclosure. A method 500 begins at block 502 with pulling an outer portion 402 of the adjustable handle 400 to an expanded position from a collapsed position. FIG. 4B shows the example adjustable handle moved to an expanded position according to one embodiment of the disclosure. The outer portion 402 is extended by height 412 to the expanded position. The outer portion 402 may then be rotated such that feature 404A of inner portion 404 is moved into a groove (not shown) in the outer portion 402 such that the outer portion 402 is fixed in the expanded position even against the force of bias mechanism 406. However, the groove and feature may alternatively be located on the outer portion 402 and the inner portion 404, respectively.

Operation of the adjustable handle 400 back to the collapsed position is described with further reference to FIG. 5. At block 506, the outer portion 402 is rotated an opposite direction as the rotation of block 504. The counter rotation of block 506 unlocks the outer portion 402 from the expanded position. Then, at block 508, the outer portion of the handle is returned to the collapsed position. The return may be effected by application of manual force on the outer portion 402, by a bias mechanism attached to the outer portion 402, or a combination of the two.

Figure 6A:
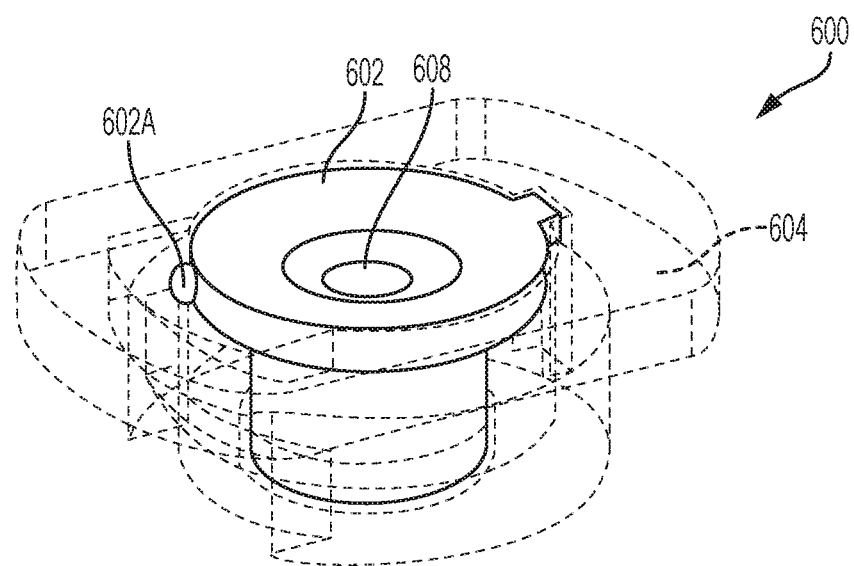
FIGS. 6A-6D are illustrations showing operation of another example adjustable handle for a computer component operated to move to an expanded position and again to a collapsed position according to one embodiment of the disclosure.

FIGS. 6A-6D are illustrations showing operation of another example adjustable handle for a computer component operated to move to an expanded position and again to a collapsed position according to one embodiment of the disclosure. Referring first to FIG. 6A, an adjustable handle 600 may include an inner portion 602 and an outer portion 604. The inner portion 602 may include an opening 608 for a fastener (not shown) to attach the adjustable handle 600 to a computer component (not shown). The inner portion 602 may include a feature 602A, such as a latch, that may be used to fix the outer portion 604 in an expanded position and/or a collapsed position. Operation of the adjustable handle 600 is described with reference to FIG. 7. FIG. 7 is an example flow chart showing operation of another example adjustable handle for a computer component according to one embodiment of the disclosure. A method 700 begins at block 702 with rotating an outer portion 604 of the adjustable handle 600 to increase a height of the handle 600. For example, the outer portion 604 may be rotated to unlock the outer portion 604 from the inner portion 602 and then a force applied to raise the outer portion 604 such that the two motions increase a height of the handle 600. In another example, the outer portion 604 may be rotated such that the feature 602A of inner portion 602 follows an angled guide groove that causes the outer portion 604 to move up and down the inner portion 602 when rotated.

Figure 6B:
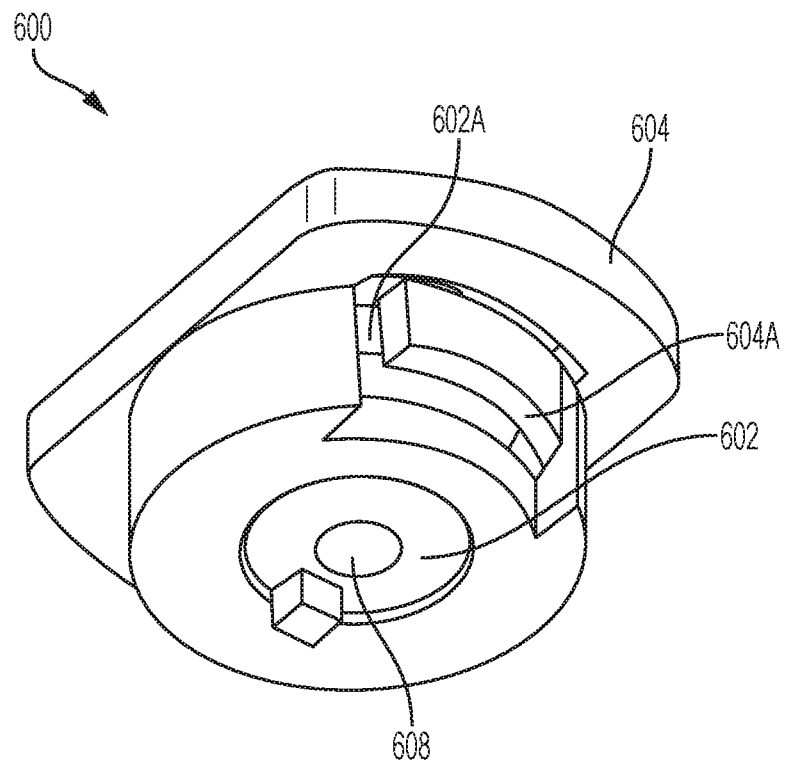
Figure 6C:
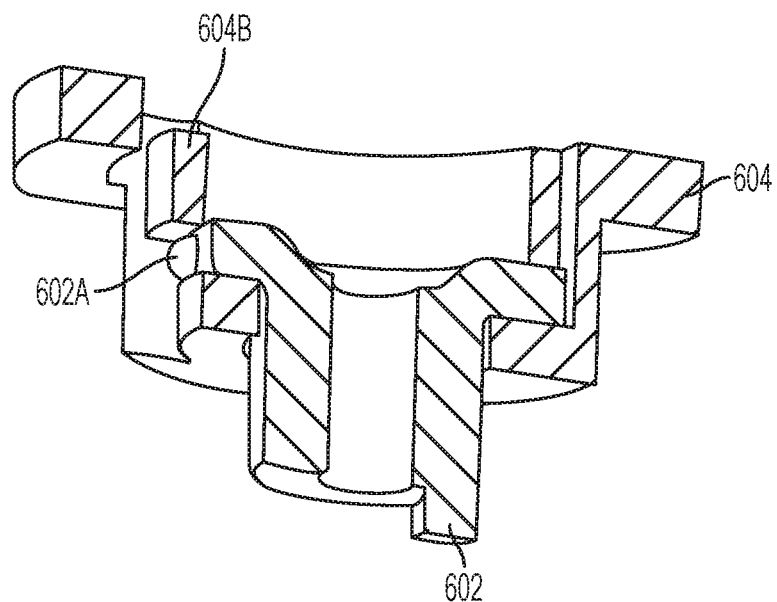
Figure 7:
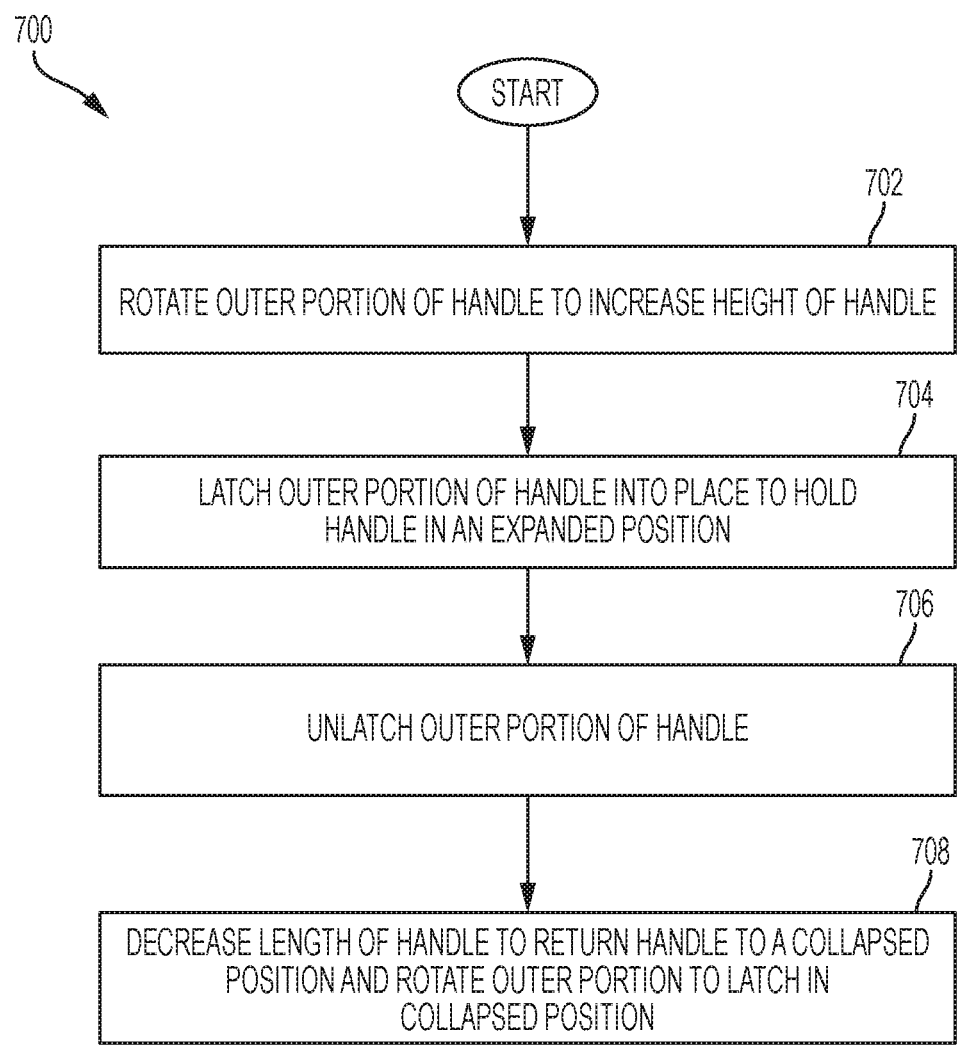
FIG. 7 is an example flow chart showing operation of another example adjustable handle for a computer component according to one embodiment of the disclosure.

FIG. 6B is an illustration showing moving of the adjustable handle to an expanded position according to one embodiment of the disclosure. The feature 602A moves through groove 604A to a portion of the groove 604A that is vertically oriented to unlock the outer portion 604. A force is then applied to move the outer portion 604 along the vertical portion of the groove 604A. Referring back to FIG. 7, at block 704, the outer portion 604 may be latched into place to hold the adjustable handle 600 in an expanded position. FIG. 6C is an illustration showing the adjustable handle 600 locked in an expanded position. A feature 602A of inner portion 602 may travel through a groove 604A defined by feature 604B to lock the outer portion 604 in the expanded position.

Figure 6D:
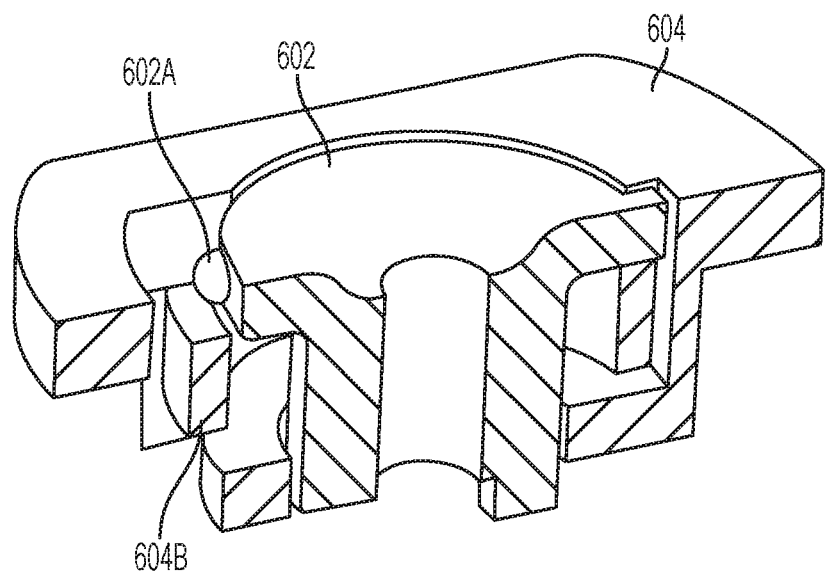

Operation of the adjustable handle 600 back to the collapsed position is described with further reference to FIG. 7. At block 706, the outer portion 604 may be unlatched by rotating the outer portion 604 to return the feature 604A of inner portion 602 to a vertical portion of the groove 604A. Then, at block 708, the outer portion is moved to decrease a height of the adjustable handle 600 and rotated to lock the adjustable handle in the collapsed portion. FIG. 6D is an illustration showing locking of the adjustable handle to a collapsed position according to one embodiment of the disclosure. The feature 602A is rotated in the groove 604A to a position over feature 604B to lock the outer portion 604 in the collapsed position to prevent unintended height changes in the adjustable handle 600.

The illustrations of FIGS. 3A-C, 4A-B, and 6A-D are generally set forth showing similar shapes for a motherboard handle. However, embodiments of the adjustable handle may take other shapes. For example, the outer portion may be a quadrilateral shape, triangular shape, polygonal shape, circular shape, elliptical shape, or the like and rotate around the inner portion. Further, the outer portion may include section designed for gripping, such as by including ribbings or other traction enhancers. In some embodiments, the outer portion may not completely surround the inner portion, such as by the outer portion being a semicircle or other partial shape around portions of the inner portion. Such embodiments may form a "T"-shaped structure when the outer portion is not a symmetrical structure. In some embodiments, the outer portion may completely surround the inner portion, such as the outer portion being circular and the inner portion being circular. Such embodiments may form a large symmetrical handle that may be easier to handle that a "T"-shaped structure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. Any of these components may include an adjustable handle for handling the component, such as the adjustable handle of the embodiments described above. The information handling system may also include one or more buses operable to transmit communications between the various hardware components.

The schematic flow chart diagram of FIG. 5 and FIG. 7 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, computer components described above may include circuitry, such as motherboards, daughterboards, circuit boards, memory boards, peripheral component boards, and the like. Further, the computer components may include drives, such as solid state drives (SSDs), compact disc read-only memory (CD-ROM) drives, digital versatile disc read-only memory (DVD-ROM) drives, and Blu-ray drives. Further, the computer components may include power supplies, circuit boards, memory modules, cache modules, graphics cards, expansion boards, wireless modules, switching modules, routing modules, etc. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
  a handle for an information handling system component comprising:
    an outer portion, and
    an inner portion affixed to the information handling system component by a fastener;
  wherein a length of a top surface of the outer portion is greater than a width of the top surface of the outer portion,
  wherein, in a collapsed position, the outer portion is contracted about the inner portion for operation of the information handling system,
  wherein, in the collapsed position, at least a portion of the top surface of the outer portion of the handle, opposite a surface of the information handling system component, is level with at least a portion of a top surface of the inner portion of the handle, opposite the surface of the information handling system component, and
  wherein, in an expanded position, the outer portion is raised above the inner portion of the handle and extended away from the information handling system component for handling of the information handling system component.

2. The apparatus of claim 1, further comprising a bias mechanism coupled to the outer portion and the inner portion and configured to return the handle to a collapsed position by applying a force to outer portion.

3. The apparatus of claim 1, wherein the inner portion comprises a latch configured to fix the handle in at least one of the expanded position and the collapsed position.

4. The apparatus of claim 3, wherein the outer portion comprises a groove, wherein the latch of the inner portion is a tab, and wherein the groove of the outer portion is configured to receive the latch of the inner portion.

5. The apparatus of claim 4, wherein the groove comprises a segment for storing the latch when the handle is in one of the expanded position and the collapsed position.

6. The apparatus of claim 1, wherein the handle further comprises an additional outer portion around the outer portion.

7. The apparatus of claim 1, wherein the handle further comprises an opening extending through at least a portion of the handle, wherein the opening is configured to receive the fastener to affix the handle to the information handling system component.

8. A handle for a computer component, comprising:
  a first piece comprising an opening extending through the first piece, wherein the opening is configured to affix the first piece to the computer component; and
  a second piece fitting around the first piece, wherein the second piece is configured to operate in conjunction with the first piece to modify a height of the handle by moving from a collapsed position to an expanded position,
  wherein the second piece is configured to rotate about the first piece to move from the collapsed position to the expanded position,
  wherein a length of a top surface of the second piece is greater than a width of the top surface of the second piece,
  wherein the second piece is configured to rotate a first amount to unlock the second piece from the collapsed position, to be pulled away from the information handling system component into the expanded position, and to rotate a second amount to lock the second piece in the expanded position, and
  wherein, in the collapsed position, at least a portion of the top surface of the second piece, opposite a surface of the computer component, is level with at least a portion of a top surface of the first piece, opposite the surface of the computer component.

9. The apparatus of claim 8, wherein the first piece comprises a latch, and wherein the second piece comprises a groove configured to receive the latch of the first piece, and wherein the groove allows fixation of the handle in at least one of the collapsed position and the expanded position.

10. The apparatus of claim 8, further comprising a bias mechanism attached to at least one of the first piece and the second piece, wherein the bias mechanism is configured to return the handle to the collapsed position in the absence of another influence.

11. The apparatus of claim 10, wherein the bias mechanism comprises a spring.

12. The apparatus of claim 8, wherein at least one of the first piece and the second piece comprise plastic.

13. The apparatus of claim 8, wherein the computer component is part of an information handling system, and the handle of the computer component is configured to allow installation of the computer component into the information handling system.

14. A method, comprising:
receiving a lateral force at an outer portion of a handle for a computer component of an information handling system, wherein a length of a top surface of the outer portion of the handle is greater than a width of the top portion of the outer surface of the handle;
receiving a rotational force at the outer portion of the handle for the computer component of an information handling system; and
moving the outer portion of the handle from a collapsed position, wherein, in the collapsed position, at least a portion of the top surface of the outer portion, opposite a surface of the computer component, is level with at least a portion of a top surface of the inner portion, opposite the surface of the computer component, to an expanded position by using the received lateral force and the received rotational force to move the outer portion away from the information handling system component,
wherein moving the outer portion of the handle from the collapsed position to the expanded position comprises rotating the outer portion about the inner portion a first amount to unlock the outer portion from the collapsed position, pulling the outer portion of the handle into the expanded position, and rotating the outer portion a second amount to lock the outer portion in the expanded position.

15. The method of claim 14, wherein the received lateral force overcomes a biasing force providing by a biasing mechanism attached to the handle that maintains the handle in the collapsed position.

16. The apparatus of claim 7, wherein the opening extends from a base of the handle through a top outermost surface of the handle such that the fastener can be accessed through the opening.

17. The apparatus of claim 8, wherein the handle further comprises an opening extending through at least a portion of the handle, wherein the opening is configured to receive the fastener to affix the handle to the information handling system component, and wherein the opening extends from a base of the handle through a top outermost surface of the handle such that the fastener can be accessed through the opening.

\* \* \* \* \*